(12) United States Patent
Huang et al.

(10) Patent No.: US 6,392,905 B1
(45) Date of Patent: May 21, 2002

(54) METHOD AND CIRCUIT FOR REDUCING BATTERY RIPPLE CURRENT IN A MULTIPLE INVERTER SYSTEM OF AN ELECTRICAL MACHINE

(75) Inventors: Henry Heping Huang, Canton; John Michael Miller, Saline; Michael W. Degner, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/756,017

(22) Filed: Jan. 6, 2001

(51) Int. Cl.[7] .................................................. H02M 7/00
(52) U.S. Cl. .............................. 363/71; 363/37; 318/705
(58) Field of Search ............................ 363/71, 40, 41, 363/43, 124, 37, 160; 307/105; 318/705, 737

(56) References Cited

U.S. PATENT DOCUMENTS

| | | | |
|---|---|---|---|
| 3,781,616 A | | 12/1973 | Mokrytzki et al. |
| 3,792,286 A | | 2/1974 | Meier |
| 3,979,662 A | | 9/1976 | Klein |
| 4,225,914 A | * | 9/1980 | Hirata et al. ................. 363/160 |
| 4,392,099 A | * | 7/1983 | Kuniyoshi .................... 318/797 |
| 4,730,242 A | * | 3/1988 | Divan ........................... 363/37 |
| 4,975,822 A | * | 12/1990 | Lipman ........................ 363/40 |
| 4,999,561 A | | 3/1991 | Kaga et al. |
| 5,016,158 A | | 5/1991 | Matsui et al. |
| 5,065,303 A | * | 11/1991 | Nguyen et al. ............... 363/40 |
| 5,099,186 A | | 3/1992 | Rippel et al. |
| 5,168,437 A | | 12/1992 | Gyugyi et al. |
| 5,212,629 A | * | 5/1993 | Jessee ........................... 363/42 |
| 5,406,185 A | * | 4/1995 | Strunk .......................... 318/767 |
| 5,434,455 A | * | 7/1995 | Kammeter ................... 307/105 |

\* cited by examiner

Primary Examiner—Rajnikant B. Patel
(74) Attorney, Agent, or Firm—Jennifer Stec

(57) ABSTRACT

A pulse width modulation circuit (10) has a first set of windings with a first inverter circuit coupled thereto and a second set of windings having a second inverter circuit coupled thereto. A pulse width modulation controller pulse width modulates the first inverter circuit and the second inverter circuit so that the first inverter circuit has a predetermined phase shift therebetween to reduce input ripple.

6 Claims, 5 Drawing Sheets

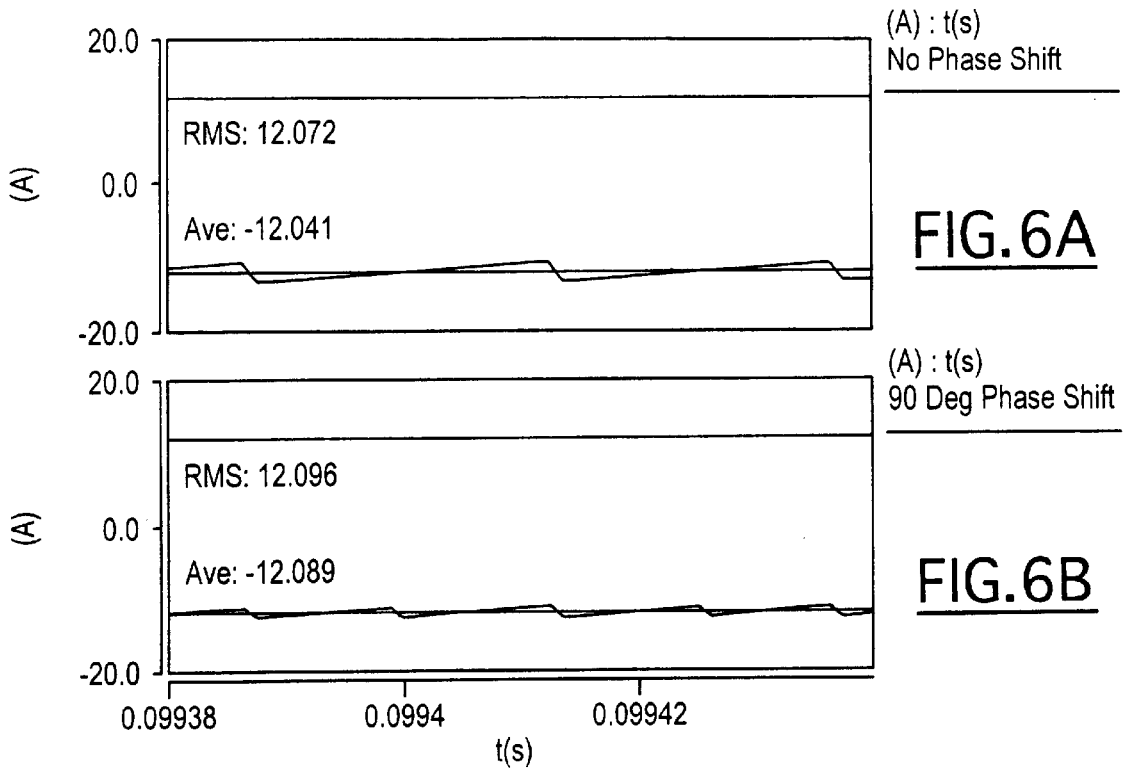
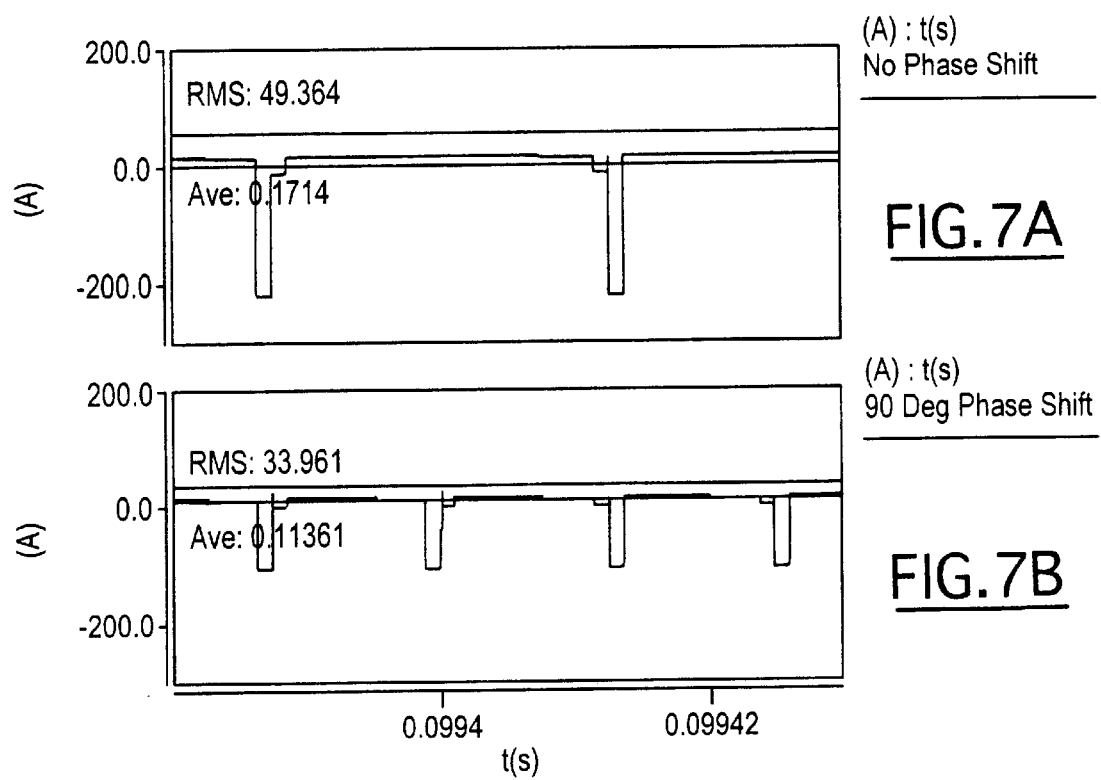

METHOD AND CIRCUIT FOR REDUCING BATTERY RIPPLE CURRENT IN A MULTIPLE INVERTER SYSTEM OF AN ELECTRICAL MACHINE

TECHNICAL FIELD

The present invention relates generally to rotating electrical machines, and more particularly, to a method and circuit for reducing ripple current in a multiple inverter system.

BACKGROUND

Multiple electrical machines or a single electrical machine having two windings or more that are each connected to a separate inverter circuit are typically operated in a fixed manner. Oftentimes, the switching of the inverter circuits occurs simultaneously resulting in a high ripple current in the DC bus. The result of a high ripple current is that a large capacitor must be used to help reduce the ripple current. In automotive applications, the DC bus is often connected to a battery which is sensitive to ripple current. That is, if a high ripple current is present on the DC bus the life cycle of the battery may be reduced. Also, the durability of the capacitor coupled to the DC bus is also reduced by a high ripple current, forcing the use of a higher ripple current rated capacitor which increases its cost. A high ripple current also increases the temperature of the components on the DC bus and increases the amount of electromagnetic interference generated by the circuit.

Particularly in automotive applications in which the numbers of units produced is extremely high, it is desirable to reduce the costs of components. The capacitors used to reduce ripple current in drive circuits are expensive components. The expense increases as the size of the capacitor increases. Therefore, it would be desirable to reduce ripple current and therefore reduce the size of the capacitor to decrease the cost of the circuit.

Known systems for reducing ripple current include operating the first inverter and a second inverter to cancel harmonics. Oftentimes the systems are operated with transformers that require a minimum inverter frequency at a maximum voltage. Therefore, one example of a phase displaced multiple inverter bridge circuit with waveform notching is described in U.S. Pat. No. 5,168,473. However, such a system is operated with a fixed phase difference between the inverters.

Because operating conditions, particularly in an automotive application, are continually varying, it would also be desirable to provide a system that varies the phase difference between the switching of the inverter circuits.

SUMMARY OF THE INVENTION

It is therefore one object of the invention to provide a circuit for controlling an electrical machine that can vary the phase between the switching of the inverters in response to the varying operating conditions of the circuit.

In one aspect of the invention, a circuit for controlling an electrical machine has a first set of windings with a first inverter circuit coupled thereto and a second set of windings having a second inverter circuit coupled thereto. A pulse width modulation controller pulse width modulates the first inverter circuit and the second inverter circuit so that the first inverter circuit has a predetermined phase shift therebetween to reduce output ripple.

One feature of the invention is that the pulse width modulating controller varies the phase difference between the first inverter circuit and the second inverter circuit in response to an operating condition of the electrical machine.

In a further aspect of the invention, a method for operating an electrical machine comprises the steps of pulse width modulating a first inverter circuit to have a first electrical phase angle;

pulse width modulating a second inverter circuit to have a second electrical phase angle;

sensing an operating condition of the electrical machine;

controlling the steps of pulse width modulating a first inverter circuit and pulse width modulating a second inverter circuit to reduce a ripple current in response to the predetermined operating condition.

One advantage of the invention is that the teachings of the present invention may be applied to control circuits for electrical machines that have more than two sets of windings and inverters. That is, three or more sets of windings and inverters may be simultaneously controlled by a pulse width modulating controller to reduce ripple current in the DC bus capacitors and associated components.

Other objects and features of the present invention will become apparent when viewed in light of the detailed description of the preferred embodiment when taken in conjunction with the attached drawings and appended claims.

BRIEF DESCRIPTION OF THE DRAWINGS

FIGS. 6A and 6B are plots of battery current with a capacitor typical of a system capacitance.

FIGS. 7A and 7B are plots of capacitor current using a larger capacitor similar to that in a typical system.

DESCRIPTION OF THE PREFERRED EMBODIMENT

Figure 1:
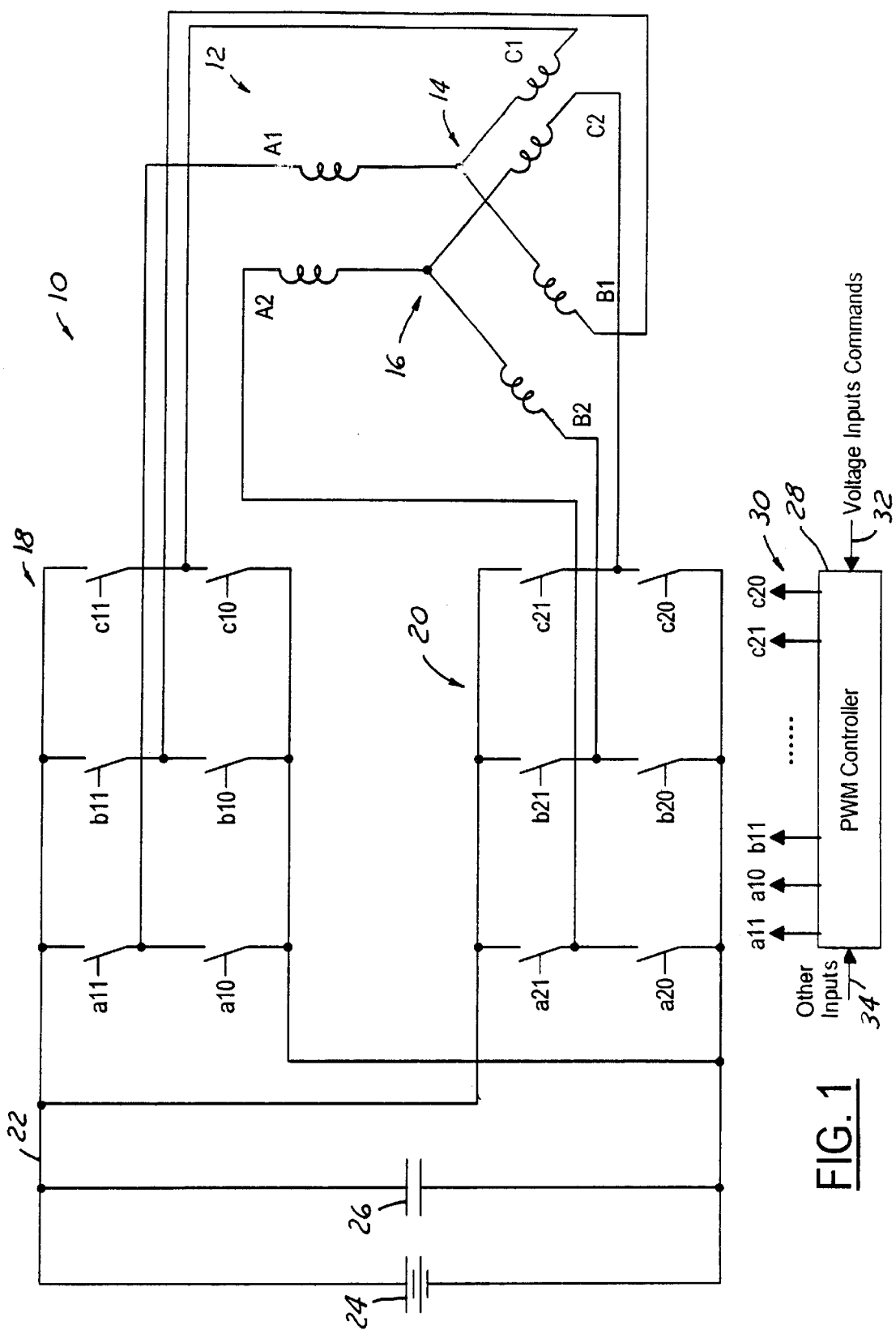
FIG. 1 is a schematic view of an embodiment of a control circuit for an electrical machine according to the present invention.

Referring now to FIG. 1, the following description is provided with respect to a two winding circuit having two associated inverter circuits coupled thereto. Those skilled in the art will recognize that more than two winding circuits and inverter circuits may be used following the teachings of the present invention. Also, the present invention applies equally to two or more electrical machines each with a set of windings coupled to the same direct current bus.

Referring now to FIG. 1, a circuit for controlling an electrical machine generally represented by reference numeral 12 is illustrated. The electrical machine has two sets of windings 14, 16, each of which have three phases illustrated. The first set of windings 14 has three phases A1, B1, and C1. The second set of windings 16 has three windings A2, B2, and C2. The first set of windings 14 and the second set of windings 16 are illustrated coupled in a wye formation. However, the present invention is equally applicable to various types of configurations including both delta, or one delta one wye, or other combinations with more than three sets of windings.

Circuit 10 further includes a first inverter 18 and a second inverter 20. Each inverter has a plurality of switches that are used to convert a DC input into an AC output in a conventional manner. Inverter circuits 18, 20 are coupled to a DC bus 22 that is coupled to a battery 24 and a capacitor 26. First inverter 18 has a first set of switches $a_{11}$ and $a_{10}$ coupled to first phase of the first set of windings 14. The first inverter 18 also has a second set of switches $b_{11}$ and $b_{10}$ and a third set of switches $c_{11}$ and $c_{10}$ coupled to a respective second and third phase of the first set of windings 14. As will be evident to those skilled in the art, preferably the circuit 10 has inverter circuits which are equivalent and machine windings that are also equivalent.

Likewise, the second inverter circuit 20 has a first set of switches $a_{21}$ and $a_{20}$, a second set of switches $b_{21}$, $b_{20}$, and a third set of switches $c_{21}$, $c_{20}$ coupled to a respective first phase $A_2$, a second phase $B_2$, and a third phase $C_2$.

Circuit 10 also includes a pulse width modulating controller 28 that is used to control the switching of the various switches of the first inverter 18 and the second inverter 20. As illustrated, pulse width modulating controller 28 has outputs 30 that are generally labeled with the switches that are controlled thereby. Each of the outputs 30 are coupled to the switches, but for simplicity, the actual direct connections have been removed. Pulse width modulating controller 28 has voltage command inputs 32. Voltage command inputs 32 receive the desired voltage for the various windings. Pulse width modulating controller 28 controls the operation of switches in response to the voltage command inputs to provide the desired voltage at the windings.

Pulse width modulating controller 28 may also include an "other" input 34. "Other" input 34 is illustrated as a separate input, and the function of this may be incorporated into voltage command input 32. Other inputs 34 are used to represent that other inputs may be used to control the pulse width modulation of the various circuits. Other inputs 34 may include other operating current parameters of the vehicle to which it is attached or to the operating conditions of the circuit. Other inputs 34 may correspond to, for example, the amount of voltage or the magnitude of voltage at the voltage command input 32, the average magnitude of current flowing on the DC bus circuit 22 from the battery 24, or the magnitude of the phase currents in the first set of windings 14 or the second set of windings 16.

The pulse width modulating controller 28 generates pulse width modulated signals for all inverters and is capable of setting phase differences among the pulse width modulating signals to the inverters. The pulse width modulating signals can be generated by well-known sine-triangle method, space vector techniques, or any other means. A phase shift between first inverter 18 and second inverter 20 means that the relative shift of the control signals sent from the pulse width modulating controller to the corresponding switch in the first inverter is shifted by an amount relative to the corresponding switch of the second inverter 20. By providing the relative phase delay, the ripple current on the DC bus 22 is reduced which allows the potential for reducing the size of capacitor 26.

In operation, voltage command inputs 32 are provided to the pulse width modulating controller which in conjunction with optional other inputs 34 controls the pulse width modulation for each of the switches connected to the first set of windings 14 and the second set of windings 16. A relative phase difference between the switching of the switches connected to the first set of windings 14 and the second set of windings 16 is controlled by the pulse width modulation controller 28. By controlling the phase difference, the ripple current is reduced on the DC bus 22.

Figure 2:
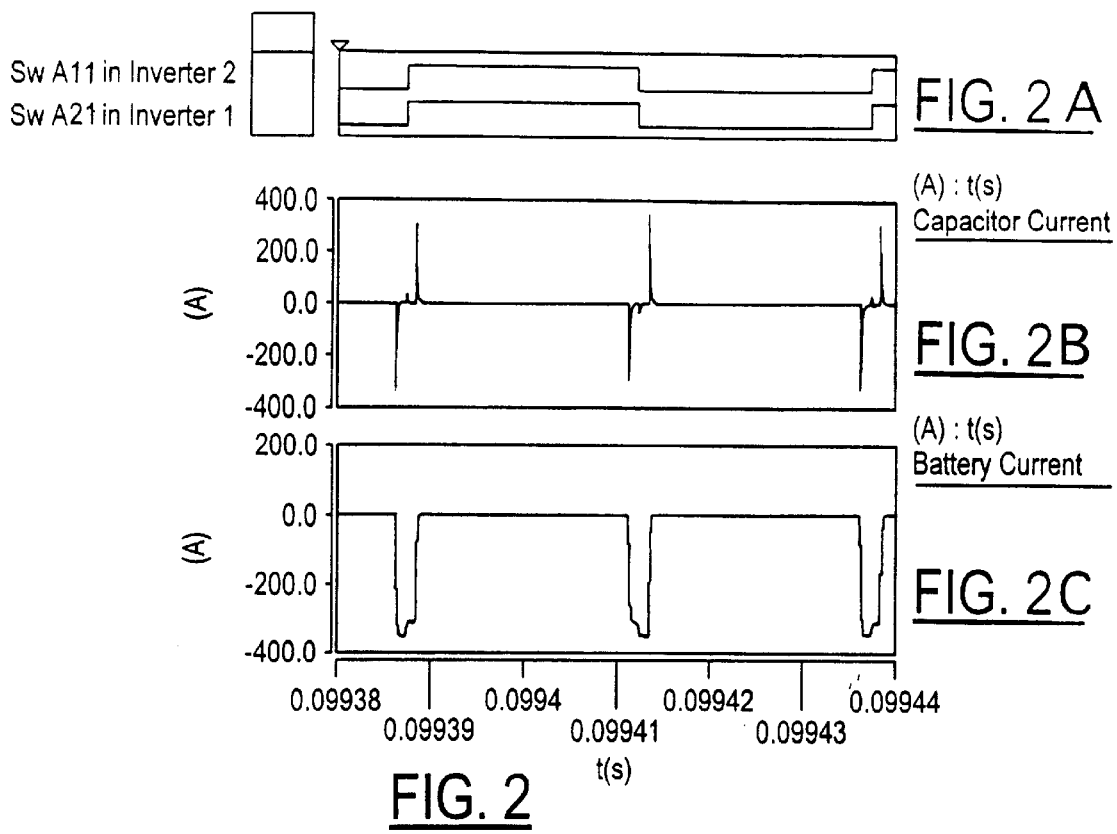
FIGS. 2A, 2B, and 2C are respective plots of two inverter switching signals without phase shift and the resultant capacitor current and battery current without a phase shift in the inverter circuit.
Figure 3:
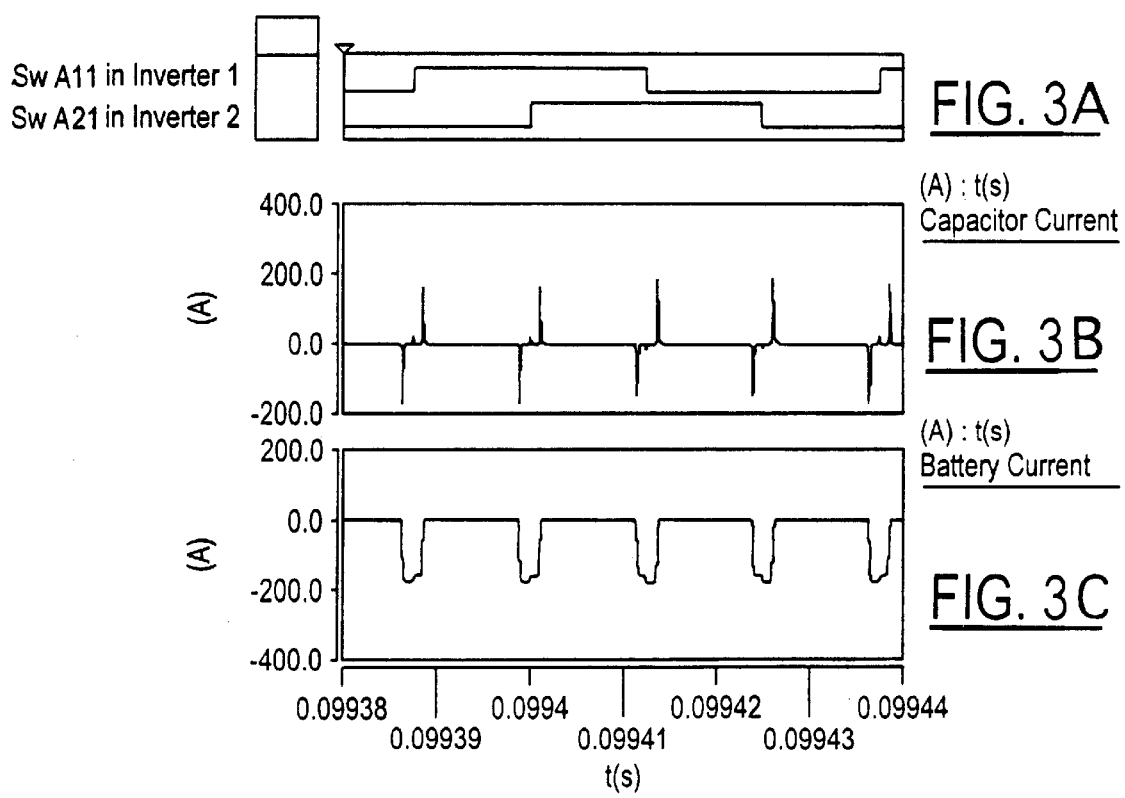
FIGS. 3A, 3B, and 3C are respective current plots of two inverter switching signals with 90 degrees phase shift and the resultant capacitor current and battery current with a 90 degrees phase shift in the inverter circuit.

Referring now to FIGS. 2A–2C and FIGS. 3A–3C, an inverter is operated with no phase shift as is commonly done in the prior art. As illustrated, the corresponding capacitor current in FIG. 2B and the corresponding battery current in FIG. 2C is relatively large when compared to FIG. 3 in which the switches of the first inverter 18 and the switches of the second inverter 20 are operated with a 90 degrees phase shift.

Figures 4A, 4B, 4C, 4D:
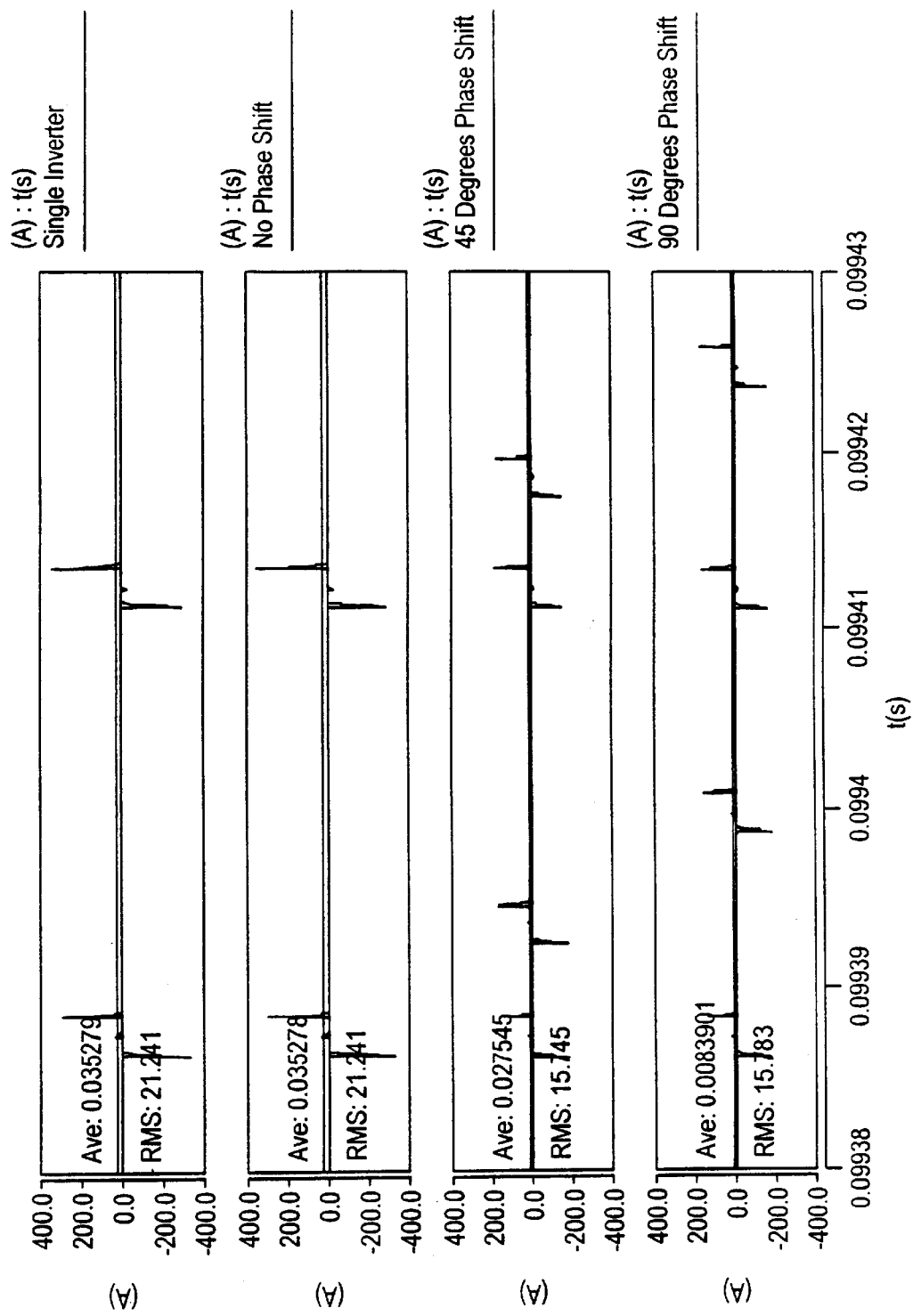
FIGS. 4A, 4B, 4C, and 4D illustrate a capacitor current comparison between a respective single inverter circuit, a dual inverter circuit with no phase shift, a dual inverter circuit with a 45 degrees phase shift, and a dual inverter circuit with a 90 degrees phase shift.
Figure 5A:
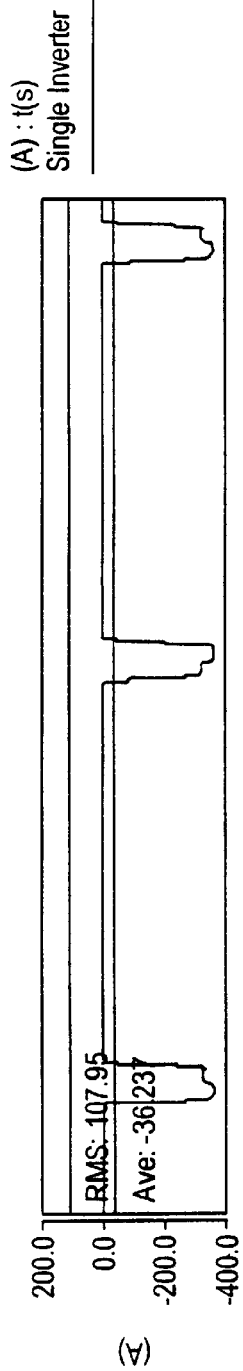
FIGS. 5A, 5B, 5C, and 5D illustrate a battery current comparison between a respective single inverter circuit, dual inverter circuit with no phase shift, a dual inverter circuit with a 45 degrees phase shift, and a dual inverter circuit with a 90 degrees phase shift.
Figure 5B:
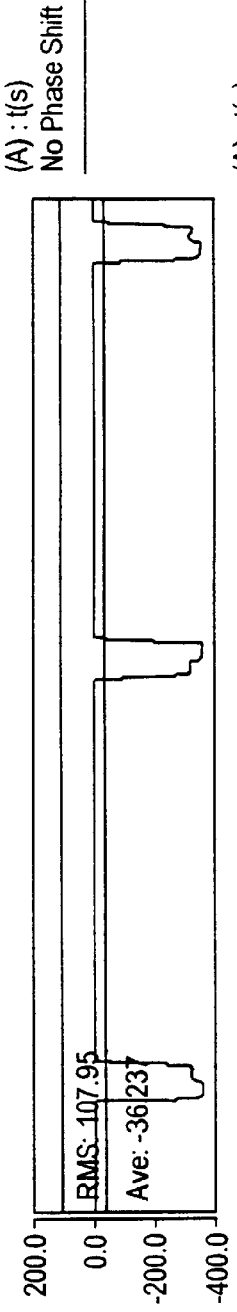
Figure 5C:
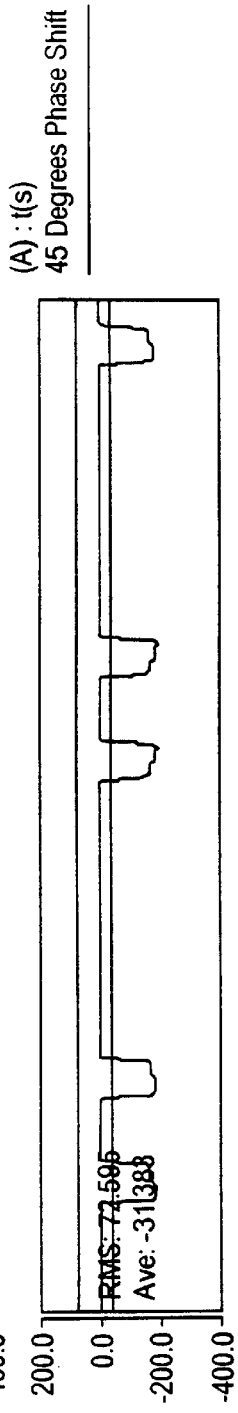
Figure 5D:
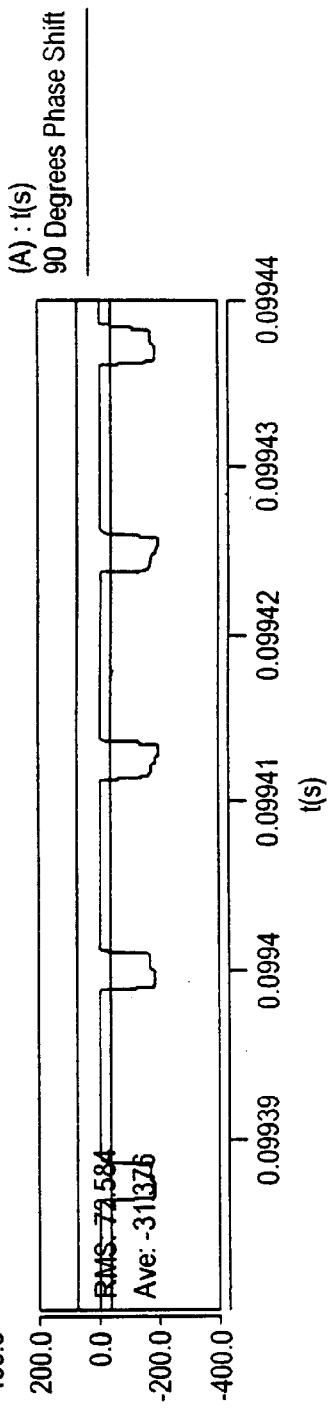

Referring now to FIGS. 4 and 5, respective simulation results based on a dual inverter system shown in FIG. 1 has been plotted with respect to respective capacitor current ripple and battery current ripple. In FIGS. 4A and 5A, a single inverter system is used for comparison with a no phase shift system in FIGS. 4B and 5B. A system according to the present invention is illustrated in FIGS. 4C and 4D and FIGS. 5C and 5D. As can be seen, the voltage ripples of FIGS. 4C and 4D and FIGS. 5C and 5D have been significantly reduced over the ripples of FIGS. 4A and 4B and FIGS. 5A and 5B.

Referring now to FIG. 6, the battery current for a system with no phase shift is compared to a system with a 90 degrees phase shift such as that shown in FIG. 1. In FIG. 6, the capacitor was sized to be about 0.01 Farads to simulate a capacitor of the size typically used in such systems. As can be seen, the variation about the averages of each of the signals is lower in the system shown in FIG. 6B corresponding to the present invention.

Referring now to FIG. 7, a capacitor current is shown in FIGS. 7A and 7B in a similar manner to those of FIG. 6 relative to battery current.

While particular embodiments of the invention have been shown and described, numerous variations alternate embodiments will occur to those skilled in the art. Accordingly, it is intended that the invention be limited only in terms of the appended claims.

What is claimed is:

1. A method for operating an electrical machine comprising the steps of:
   pulse width modulating a first inverter circuit to have a first electrical phase angle;
   pulse width modulating a second inverter circuit to have a second electrical phase angle;
   sensing an operating condition of the electrical machine; and
   controlling the steps of pulse width modulating a first inverter circuit and pulse width modulating a second inverter circuit to reduce a ripple current in response to said operating condition by providing a relative phase angle difference between the first electrical phase angle and the second electrical phase angle.

2. A circuit comprising:
a first set of windings;
a first inverter circuit coupled to said first set of windings;
a second set of windings;
a second inverter circuit coupled to said second set of windings;
a pulse width modulating controller having an operating condition input receiving an operating condition, said pulse width modulating controller pulse width modulating said first inverter circuit and said second inverter circuit so that said first inverter circuit and said second inverter circuit have a phase difference corresponding to said operating condition to reduce an input ripple.

3. A circuit as recited in claim 2, wherein said operating condition comprises a magnitude of a voltage demanded.

4. A circuit as recited in claim 2, wherein said first set of windings are configured in a wye configuration.

5. A circuit as recited in claim 2, wherein said second set of windings are configured in a wye configuration.

6. A circuit as recited in claim 2 wherein said first set of windings is formed in a first electrical machine and said second set of windings is formed in a second electrical machine.

* * * * *